United States Patent
Li et al.

(10) Patent No.: US 10,025,752 B2
(45) Date of Patent: Jul. 17, 2018

(54) DATA PROCESSING METHOD, PROCESSOR, AND DATA PROCESSING DEVICE

(71) Applicant: Huawei Technologies Co., Ltd., Shenzhen (CN)

(72) Inventors: Nan Li, Shenzhen (CN); Linchun Wang, Shenzhen (CN); Hongfei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/337,872

(22) Filed: Oct. 28, 2016

(65) Prior Publication Data

US 2017/0046306 A1 Feb. 16, 2017

Related U.S. Application Data

(63) Continuation of application No. PCT/CN2015/075783, filed on Apr. 2, 2015.

(30) Foreign Application Priority Data

Apr. 30, 2014 (CN) .......................... 2014 1 0182569

(51) Int. Cl.
*G06F 15/76* (2006.01)
*G06F 13/40* (2006.01)
*G06F 15/80* (2006.01)
*G06F 15/163* (2006.01)
*G06F 9/38* (2018.01)
*G06F 13/16* (2006.01)
*G06F 15/82* (2006.01)
*G06F 15/17* (2006.01)

(52) U.S. Cl.
CPC ................ *G06F 15/80* (2013.01); *G06F 9/38* (2013.01); *G06F 15/163* (2013.01);
(Continued)

(58) Field of Classification Search
CPC ........ G06F 15/163; G06F 15/17; G06F 15/80; G06F 15/825; G06F 9/38; G06F 9/3826;
(Continued)

(56) References Cited

U.S. PATENT DOCUMENTS 5,050,095 A * 9/1991 Samad ..................... G06N 3/08
706/25
5,852,742 A 12/1998 Vondran, Jr. et al.
(Continued)

FOREIGN PATENT DOCUMENTS

CN 1466347 A 1/2004
CN 1643499 A 7/2005
(Continued)

*Primary Examiner* — Daniel H Pan
(74) *Attorney, Agent, or Firm* — Leydig Voit & Mayer, Ltd.

(57) ABSTRACT

Disclosed are a data processing method, a processor, and a data processing device. The method comprises: an arbiter sends data $D_{(a,1)}$ to a first processing circuit; the first processing circuit processes the data $D_{(a,1)}$ to obtain data $D_{(1,2)}$, the first processing circuit being a processing circuit among m processing circuits; the first processing circuit sends the data $D_{(1,2)}$ to a second processing circuit; the second processing circuit to an $m^{th}$ processing circuit separately process the received data; and the arbiter receives data $D_{(m,a)}$ sent by the $m^{th}$ processing circuit. The processor comprises an arbiter and a first processing circuit to an $(m+1)^{th}$ processing circuit. Each processing circuit in the first processing circuit to the $(m+1)^{th}$ processing circuit can receive first data to be processed sent by the arbiter, and process the first data to be processed. The scheme is helpful to improve efficiency of data processing.

15 Claims, 7 Drawing Sheets

(52) U.S. Cl.
CPC .......... *G06F 9/3826* (2013.01); *G06F 9/3828* (2013.01); *G06F 13/1605* (2013.01); *G06F 13/4031* (2013.01); *G06F 15/17* (2013.01); *G06F 15/825* (2013.01); *G06F 2207/3868* (2013.01)

(58) Field of Classification Search
CPC .......... G06F 9/3828; G06F 2207/3868; G06F 13/1605; G06F 13/4031
USPC ........ 712/1–43, 225; 710/240–244, 309, 312
See application file for complete search history.

(56) References Cited

U.S. PATENT DOCUMENTS

| | | |
|---|---|---|
| 2002/0013861 A1 | 1/2002 | Adiletta et al. |
| 2007/0053355 A1 | 3/2007 | Liu |
| 2008/0130502 A1* | 6/2008 | Charny .................. H04L 47/10 370/235 |
| 2009/0007133 A1 | 1/2009 | Paul et al. |
| 2010/0293312 A1 | 11/2010 | Sonnier et al. |
| 2010/0315965 A1* | 12/2010 | Nemeth ................ H04L 1/0083 370/252 |
| 2012/0278590 A1 | 11/2012 | Lin et al. |
| 2013/0258845 A1 | 10/2013 | Boden et al. |

FOREIGN PATENT DOCUMENTS

| | | |
|---|---|---|
| CN | 1885822 A | 12/2006 |
| CN | 101477512 A | 7/2009 |
| CN | 102122275 A | 7/2011 |
| CN | 102306139 A | 1/2012 |
| CN | 103955445 A | 7/2014 |
| WO | WO 2013101147 A1 | 7/2013 |

* cited by examiner

DATA PROCESSING METHOD, PROCESSOR, AND DATA PROCESSING DEVICE

CROSS-REFERENCE TO RELATED APPLICATIONS

This application is a continuation of International Application No. PCT/CN2015/075783, filed on Apr. 2, 2015, which claims priority to Chinese Patent Application No. 201410182569.4, filed on Apr. 30, 2014. The disclosures of the aforementioned applications are hereby incorporated by reference in their entireties.

FIELD

The embodiments of the present application relates to the technical field of communication, and in particular to a data processing method, a processor and a data processing device.

BACKGROUND

Figure 1:
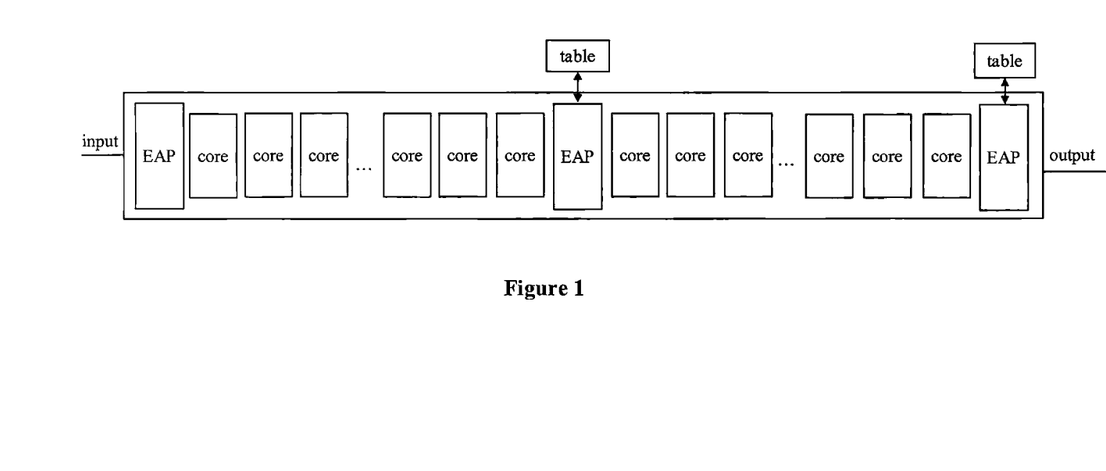
FIG. 1 is a schematic structural diagram of a conventional network processor having a pipeline architecture.

Conventionally, a network processor may have a pipeline architecture. A HX300 network processor of the Marvell company has a programmable pipeline architecture which may be regarded as similar to a pipeline in an automobile production process. The HX300 network processor includes multiple cores. The multiple cores are grouped into N groups, and the different groups are coupled in a pipeline way. Each core in the pipeline only implements some of functions, and the multiple cores implement all functions by cooperation. For example, a first core performs packet header analysis, a second core performs multiprotocol label switching (MPLS) protocol, and a third core searches an access control list (ACL). In this case, each core only performs some of functions. Each core corresponds to a segment of microcodes. Multiple segments of microcodes corresponding to the multiple cores are integrated to obtain complete microcodes. Multiple engine access points (EAP) units may be included among the cores of the processor to implement an operation of table lookup, as shown in FIG. 1. In the above-described technical solution, efficiency of the processor for processing data is low.

SUMMARY

A data processing method and a processor are provided according to embodiments of the present application, to improve efficiency of the processor for processing data.

In a first aspect, a data processing method is provided, which includes:

sending, by an arbiter, data $D_{(a,1)}$ to a first processing circuit; processing, by the first processing circuit, the data $D_{(a,1)}$ to obtain data $D_{(1,2)}$, where the first processing circuit is one of m processing circuits, and the m processing circuits include the first processing circuit to an m-th processing circuit; sending, by the first processing circuit, the data $D_{(1,2)}$ to a second processing circuit; processing, by the second processing circuit to the m-th processing circuit, received data respectively, where an i-th processing circuit processes data $D_{(i-1,i)}$ provided by an (i−1)-th processing circuit to obtain data $D_{(i,i+1)}$, and the i-th processing circuit sends the data $D_{(i,i+1)}$ to an (i+1)-th processing circuit; and receiving, by the arbiter, data $D_{(m,a)}$ sent by the m-th processing circuit, where m is an integer greater than 1, the arbiter and the first processing circuit to the m-th processing circuit are components of a processor, the processor further includes an (m+1)-th processing circuit, and each of the first processing circuit to the (m+1)-th processing circuit is capable of receiving first data to be processed sent by the arbiter and processing the first data to be processed.

In conjunction with the first aspect, in a first possible implementation of the first aspect, the method further includes:

sending, by an x-th processing circuit, data $D_{(x,m+1)}$ to the (m+1)-th processing circuit, where the data $D_{(x,m+1)}$ is identical to data $D_{(x,x+1)}$, the data $D_{(x,x+1)}$ is obtained by processing, by the x-th processing circuit, data $D_{(x-1,x)}$ provided by an (x−1)-th processing circuit, and the x-th processing circuit is one of the first processing circuit to an (m−1)-th processing circuit.

In conjunction with the first possible implementation of the first aspect, in a second possible implementation of the first aspect, after sending, by the x-th processing circuit, the data $D_{(x,m+1)}$ to the (m+1)-th processing circuit, the method further includes: processing, by the (m+1)-th processing circuit, the data $D_{(x,m+1)}$ to obtain data $D_{(m+1,y)}$; and sending, by the (m+1)-th processing circuit, the data $D_{(m+1,y)}$ to a y-th processing circuit, where the y-th processing circuit is the arbiter or one of an (x+2)-th processing circuit to the m-th processing circuit.

In conjunction with the second possible implementation of the first aspect, in a third possible implementation of the first aspect, the method further includes: receiving, by the y-th processing circuit, the data $D_{(m+1,y)}$, where the y-th processing circuit is one of the (x+2)-th processing circuit to the m-th processing circuit; performing, by the y-th processing circuit, mergence on the data $D_{(m+1,y)}$ and data $D_{(y-1,y)}$ to obtain merged data, where the data $D_{(y-1,y)}$ is data provided by an (y−1)-th processing circuit; processing, by the y-th processing circuit, the merged data to obtain data $D_{(y,y+1)}$; and sending, by the y-th processing circuit, the data $D_{(y,y+1)}$ to a (y+1)-th processing circuit or the arbiter.

In conjunction with the third possible implementation of the first aspect, in a fourth possible implementation of the first aspect, performing, by the y-th processing circuit, mergence on the data $D_{(m+1,y)}$ and the data $D_{(y-1,y)}$ to obtain the merged data includes:

retaining, by the y-th processing circuit, one of the data $D_{(m+1,y)}$ and the data $D_{(y-1,y)}$; or aligning, by the y-th processing circuit, the data $D_{(m+1,y)}$ and the data $D_{(y-1,y)}$ field by field, and selecting, for each field, data of the data $D_{(m+1,y)}$ or data $D_{(y-1,y)}$ in the field, to form the merged data.

In conjunction with the first aspect or any one of the first possible implementation of the first aspect to the fourth possible implementation of the first aspect, in a fifth possible implementation of the first aspect, for any two processing circuits, a p-th processing circuit and a q-th processing circuit, of the first processing circuit to the m-th processing circuit, an output terminal of the p-th processing circuit is connected to an input terminal of the q-th processing circuit, and an output terminal of the q-th processing circuit is not connected to an input terminal of the p-th processing circuit, where p is less than q.

In a second aspect, a processor is provided, which includes:

an arbiter; m processing circuits including a first processing circuit to an m-th processing circuit, where the m processing circuits are coupled to the arbiter respectively, and m is an integer greater than 1; and an (m+1)-th processing circuit coupled to the arbiter, where each of the first processing circuit to the (m+1)-th processing circuit is capable of receiving first data to be processed sent by the arbiter and processing the first data to be processed, where the arbiter is configured to send data $D_{(a,1)}$ to the first processing circuit; the first processing circuit is configured to process the data $D_{(a,1)}$ to obtain data $D_{(1,2)}$, and send the data $D_{(1,2)}$ to a second processing circuit; and the second processing circuit to the m-th processing circuit are configured to process received data respectively, and where an i-th processing circuit is configured to process data $D_{(i-1,i)}$ provided by an (i−1)-th processing circuit to obtain data $D_{(i,i+1)}$, and send the data $D_{(i,i+1)}$ to an (i+1)-th processing circuit; and the arbiter is further configured to receive data $D_{(m,a)}$ sent by the m-th processing circuit.

In conjunction with the second aspect, in a first possible implementation of the second aspect, an x-th processing circuit is configured to send data $D_{(x,m+1)}$ to the (m+1)-th processing circuit, where the data $D_{(x,m+1)}$ is identical to data $D_{(x,x+1)}$, the data $D_{(x,x+1)}$ is obtained by processing, by the x-th processing circuit, data $D_{(x-1,x)}$ provided by an (x−1)-th processing circuit, and the x-th processing circuit is one of the first processing circuit to an (m−1)-th processing circuit.

In conjunction with the first possible implementation of the second aspect, in a second possible implementation of the second aspect, the (m+1)-th processing circuit is configured to process the data $D_{(x,m+1)}$ to obtain data $D_{(m+1,y)}$ and send the data $D_{(m+1,y)}$ to a y-th processing circuit, where the y-th processing circuit is the arbiter or one of an (x+2)-th processing circuit to the m-th processing circuit.

In conjunction with the second possible implementation of the second aspect, in a third possible implementation of the second aspect, in a case that the y-th processing circuit is one of the (x+2)-th processing circuit to the m-th processing circuit, the y-th processing circuit is further configured to: receive the data $D_{(m+1,y)}$; perform mergence on the data $D_{(m+1,y)}$ and data $D_{(y-1,y)}$ to obtain merged data, where the data $D_{(y-1,y)}$ is data provided by a (y−1)-th processing circuit; process the merged data to obtain data $D_{(y,y+1)}$; and send the data $D_{(y,y+1)}$ to a (y+1)-th processing circuit or the arbiter.

In conjunction with the third possible implementation of the second aspect, in a fourth possible implementation of the second aspect, the y-th processing circuit is configured to:

retain one of the data $D_{(m+1,y)}$ and the data $D_{(y-1,y)}$; or align the data $D_{(m+1,y)}$ and the data $D_{(y-1,y)}$ field by field, and select, for each field, data of the data $D_{(m+1,y)}$ or data $D_{(y-1,y)}$ in the field, to form the merged data.

In conjunction with the second aspect or any one of the first implementation of the second aspect to the fourth implementation of the second aspect, in a fifth implementation of the second aspect, for any two processing circuits, a p-th processing circuit and a q-th processing circuit, of the first processing circuit to the m-th processing circuit, an output terminal of the p-th processing circuit is connected to an input terminal of the q-th processing circuit, and an output terminal of the q-th processing circuit is not connected to an input terminal of the p-th processing circuit, where p is less than q.

In a third aspect, a data processing device is provided, which includes:

a receiver configured to receive first data;

a processor in the second aspect or any one of the first implementation of the second aspect to the fifth implementation of the second aspect, configured to process the first data to obtain second data; and a transmitter configured to transmit the second data.

The preset application has advantages as follows.

In an embodiment of the present application, the arbiter sends the data $D_{(a,1)}$ to the first processing circuit. The first processing circuit processes the data $D_{(a,1)}$ to obtain the data $D_{(1,2)}$. The first processing circuit is one of the m processing circuits. The m processing circuits include the first processing circuit to the m-th processing circuit. The first processing circuit sends the data $D_{(1,2)}$ to the second processing circuit. The second processing circuit to the m-th processing circuit process the received data respectively. The i-th processing circuit processes the data $D_{(i-1,i)}$ provided by the (i−1)-th processing circuit to obtain the data $D_{(i,i+1)}$, and the i-th processing circuit sends the data $D_{(i,i+1)}$ to the (i+1)-th processing circuit. The arbiter receives the data $D_{(m,a)}$ sent by the m-th processing circuit. m is an integer greater than 1. The arbiter and the first processing circuit to the m-th processing circuits are components of the processor. The processor further includes the (m+1)-th processing circuit. Each of the first processing circuit to the (m+1)-th processing circuit can receive the first data to be processed sent by the arbiter, and process the first data to be processed. Hence, in a case that m processing circuits in the processor including (m+1) processing circuits can achieve data processing, only an m-stage pipeline is required in the process of data processing. That is, after the m processing circuits process the received data respectively, the m-th processing circuit outputs the processed data to the arbiter. Conventionally, in a case that a processor including (m+1) processing circuits processes data, an (m+1)-stage pipeline is required in the process of data processing. That is, conventionally, after the (m+1) processing circuits process received data respectively, the (m+1)-th processing circuit outputs the processed data to the arbiter. Hence, the data processing method according to the embodiment of the present application can reduce time delay of data processing and improve efficiency of data processing.

DETAILED DESCRIPTION OF EMBODIMENTS

A data processing method and a processor are provided according to embodiments of the present application, to solve a conventional problem of long time delay in data processing due to a fixed pipeline.

In order to solve the above technical problem, general ideas of technical solutions according to the embodiments of the present application are as follows.

In the embodiments of the present application, an arbiter sends data $D_{(a,1)}$ to a first processing circuit. The first processing circuit processes the data $D_{(a,1)}$ to obtain data $D_{(1,2)}$. the first processing circuit is one of m processing circuits. The m processing circuits include the first processing circuit to an m-th processing circuit. The first processing circuit sends the data $D_{(1,2)}$ to a second processing circuit.

The second processing circuit to the m-th processing circuit process received data respectively. An i-th processing circuit processes data $D_{(i-1,i)}$ provided by an (i−1)-th processing circuit to obtain data $D_{(i,i+1)}$, and the i-th processing circuit sends the data $D_{(i,i+1)}$ to an (i+1)-th processing circuit. The arbiter receives data $D_{(m,a)}$ sent by the m-th processing circuit. m is an integer greater than 1. The arbiter and the first processing circuit to the m-th processing circuits are components of the processor. The processor further includes an (m+1)-th processing circuit. Each of the first processing circuit to the (m+1)-th processing circuit can receive first data to be processed sent by the arbiter, and process the first data to be processed. Hence, in a case that m processing circuits in the processor including (m+1) processing circuits can achieve data processing, only an m-stage pipeline is required in the process of data processing. That is, after the m processing circuits process the received data respectively, the m-th processing circuit outputs the processed data to the arbiter. Conventionally, in a case that a processor including (m+1) processing circuits processes data, an (m+1)-stage pipeline is required in the process of data processing. That is, conventionally, after the (m+1) processing circuits process received data respectively, the (m+1)-th processing circuit outputs the processed data to the arbiter. Hence, the data processing method according to the embodiments of the present application can reduce time delay of data processing and improve efficiency of data processing.

To make the object, technical solutions and advantages of embodiments of the present application clearer, technical solutions according to the embodiments of the present application are described clearly hereinafter in conjunction with the drawings in the embodiments of the present application. Apparently, the described embodiments are only some rather than all of embodiments of the present application. All other embodiments obtained by those skilled in the art based on the embodiments of the present application without any creative work fall within the scope of protection of the present application.

Figure 2:
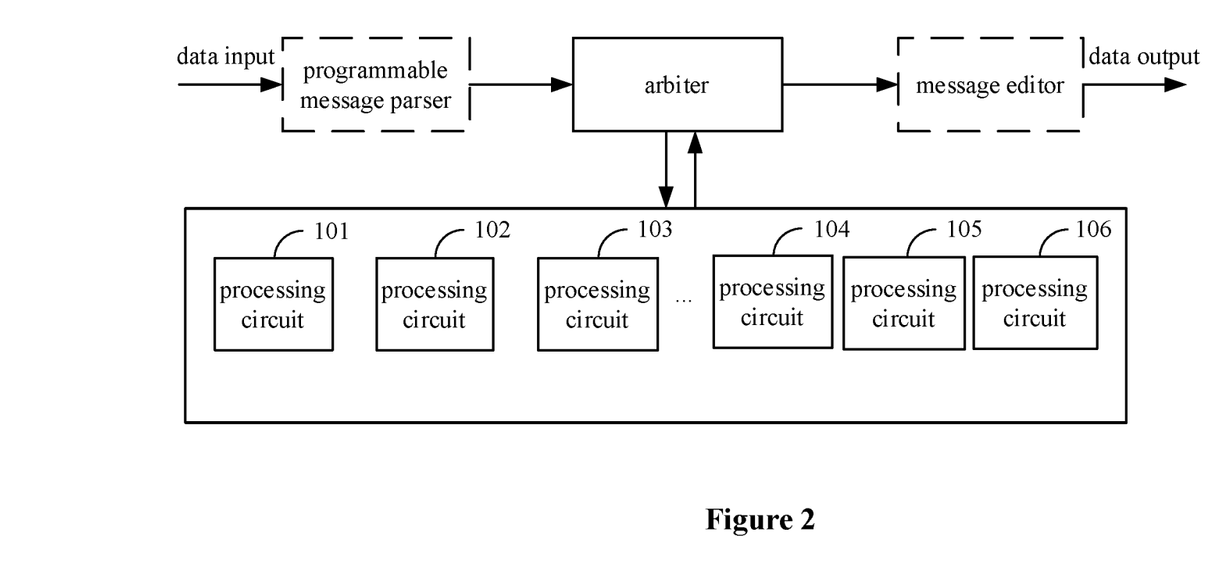
FIG. 2 is a schematic structural diagram of a processor according to embodiments of the present application.

FIG. 2 is a schematic structural diagram of a processor. The processor may be, for example, a network processor or a central processing unit (English: central processing unit, abbreviated as: CPU). The processor includes an arbiter, m processing circuits and an (m+1)-th processing circuit. The m processing circuits include a first processing circuit to an m-th processing circuits. The m processing circuits are coupled to the arbiter respectively. m is an integer greater than 1. The (m+1)-th processing circuit is coupled to the arbiter. Each processing circuit of the first processing circuit to the (m+1)-th processing circuit can receive first data to be processed sent by the arbiter and process the first data to be processed.

It should be noted that, "the first data to be processed" refers to to-be-processed data. In the embodiments of the present application, data that can be received by each processing circuit of the first processing circuit to the (m+1)-th processing circuit are not necessary to be equal.

It should be noted that, in the embodiments of the present application, data $D_{(x1,x2)}$ refers to data provided to x2 by x1 if there is no contrary description. x1 or x2 refers to the arbiter (English: arbiter, abbreviated as: a) in a case that x1 or x2 is equal to a. x1 or x2 refers to a processing circuit corresponding to a number or a symbol for indicating a number in a case that x1 or x2 is equal to the number or the symbol. For example, x1 or x2 refers to the first processing circuit in a case that x1 or x2 is equal to 1. x1 or x2 refers to the m-th processing circuit in a case that x1 or x2 is equal to m.

It should be noted that, in the embodiments of the present application, data $D_{(m,m+1)}$ does not refer to data provided to the (m+1)-th processing circuit by the m-th processing circuit, but refers to data provided to the arbiter by the m-th processing circuit. That is, the data $D_{(m,m+1)}$ refers to data $D_{(m,a)}$.

If the arbiter obtains data such as data $D_{(a,1)}$, the arbiter sends the data $D_{(a,1)}$ to the first processing circuit. The first processing circuit processes the data $D_{(a,1)}$ to obtain data $D_{(1,2)}$, and sends the data $D_{(1,2)}$ to a second processing data. The second processing circuit to the m-th processing circuit process received data respectively. Specifically, an i-th processing circuit processes data $D_{(i-1,i)}$ provided by an (i−1)-th processing circuit to obtain data $D_{(i,i+1)}$, and sends the data $D_{(i,i+1)}$ to an (i+1)-th processing circuit. The arbiter further receives the data $D_{(m,a)}$ sent by the m-th processing circuit. That is, i is a positive integer ranging from 2 to m. For example, i is in a range of 2 and 3 in a case that m is equal to 3. i is equal to 2 in a case that m is equal to 2.

The second processing circuit to the m-th processing circuit processing the received data respectively includes: processing, by the second processing circuit, the data $D_{(1,2)}$ provided by the first processing circuit to obtain $D_{(2,3)}$. The second processing circuit to the m-th processing circuit processing the received data respectively includes: processing, by the m-th processing circuit, data $D_{(m-1,m)}$ provided by an (m−1)-th processing circuit to obtain the $D_{(m,m+1)}$. From the above, the data $D_{(m,m+1)}$ refers to data provided to the arbiter by the m-th processing circuit. That is, the data $D_{(m,m+1)}$ refers to the data $D_{(m,a)}$. In addition, in a case that m is equal to 2, the operation of processing, by the second processing circuit, the data $D_{(1,2)}$ provided by the first processing circuit to obtain $D_{(2,3)}$ is the same as the operation of processing, by the m-th processing circuit, the data $D_{(m-1,m)}$ provided by the (m−1)-th processing circuit to obtain $D_{(m,m+1)}$.

Figure 3A:
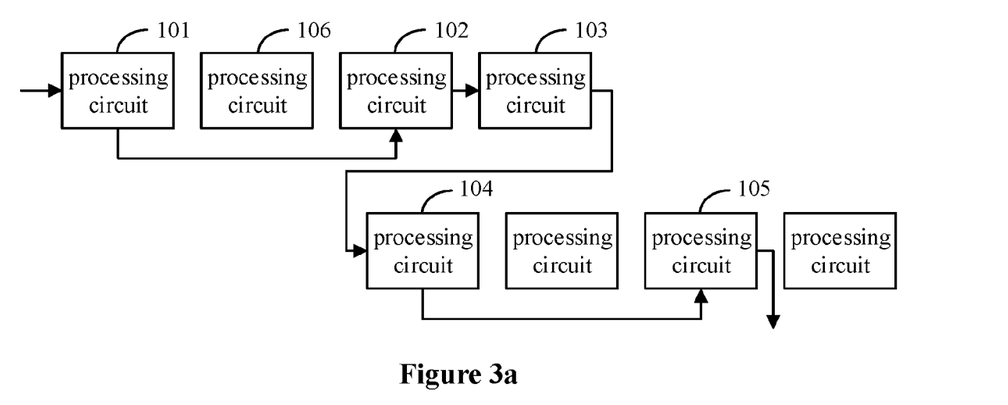
FIG. 3a to FIG. 3b are schematic structural diagrams of pipelines according to embodiments of the present application.

An example is illustrated below, and reference is made to FIG. 2 and FIG. 3a. It is assumed that the processor includes processing circuits of eight stages. As shown in FIG. 3a, stages from left to right are respectively a first stage to an eighth stage. It is assumed that m is equal to 5, the first processing circuit to the m-th processing circuit of the m processing circuits correspond to a first stage processing circuit 101, a third stage processing circuit 102, a fourth stage processing circuit 103, a fifth stage processing circuit 104 and a seventh stage processing circuit 105 respectively. In the embodiment, the (m+1)-th processing circuit is, for example, a second stage processing circuit. Practically, the (m+1)-th processing circuit may be a sixth stage processing circuit or an eighth stage processing circuit.

According to a conventional method, although the data $D_{(a,1)}$ needs to be processed by only five processing circuits, the data $D_{(a,1)}$ is inputted to the first stage processing circuit 101, traversed through the first stage processing circuit 101, the second stage processing circuit 106 to the eighth stage processing circuit in an order of stage numbers from small to large, and then outputted to the arbiter. However, as the structure of the processor according to the embodiments of the present application, the data $D_{(a,1)}$ is processed by only five processing circuits of the first stage processing circuit 101, the third stage processing circuit 102, the fourth stage processing circuit 103, the fifth stage processing circuit 104 and the seventh stage processing circuit 105, and then may be outputted to the arbiter from the seventh stage processing circuit 105. The data $D_{(a,1)}$ is not processed by the (m+1)-th processing circuit, i.e. the second stage processing circuit 106. Similarly, the data $D_{(a,1)}$ is also not processed by the sixth stage processing circuit. In other words, the unnecessary processing circuit can be skipped. Furthermore, a processing result can be outputted from the m-th processing circuit, and thus the processing of the remaining eighth stage processing circuit is unnecessary. That is, the data can skip out of the pipeline consisting of the processing circuits in advance. Hence, with the structure of the processor according to the embodiment of the present application, time delay of data processing can be reduced and efficiency of data processing can be improved.

Optionally, the first processing circuit to the m-th processing circuit process the received data based on a first code to an m-th code respectively. Specifically, the data $D_{(i,i+1)}$ includes an identifier of an (i+1)-th code, and the i-th processing circuit is the first processing circuit to the (m−1)-th processing circuit. Hence, it can be determined that the next processing circuit is the (i+1)-th processing circuit based on the identifier of the (i+1)-th code. In other words, the current processing circuit can determine which stage of the processing circuit is the next processing circuit. For example, the current processing circuit may look up a table based on the code, output a stage ID after looking up the table, and determine the next processing circuit based on the stage ID and a mapping relation between a stage ID and a processing circuit.

Optionally, which stage of the processing circuit is the first processing circuit may be determined by the arbiter in the embodiment. The preceding embodiment is described by taking the first processing circuit as the first stage processing circuit 101. In practice, the first processing circuit may be the third stage processing circuit 102.

Optionally, the processor as shown in FIG. 2 may further include a programmable message parser.

For example, the arbiter may determine the first processing circuit based on a stage ID provided by the programmable message parser as shown in FIG. 2. The stage ID may be an identifier of a code corresponding to the first processing circuit. The parser may determine the stage ID based on an ingress port.

Optionally, any one of the first processing circuit to the (m−1)-th processing circuit is labeled as an x-th processing circuit, which is configured to send data $D_{(x,m+1)}$ to the (m+1)-th processing circuit. The data $D_{(x,m+1)}$ is identical to data $D_{(x,x+1)}$, and the data $D_{(x,x+1)}$ is obtained by processing, by the x-th processing circuit, data $D_{(x-1,x)}$ provided by an (x−1)-th processing circuit. In other words, the data $D_{(x,x+1)}$ obtained by processing by the x-th processing circuit is prepared as two copies and are sent to the (m+1)-th processing circuit and an (x+1)-th processing circuit respectively. The sending to the (x+1)-th processing circuit may be obtained in a processing manner of the first processing circuit to the m-th processing circuit described above. That is, the structure of the processor according to the embodiment of the present application supports processing data in a manner of parallel processing, and is generally applied to a scenario in which parallel lookup is used to reduce time delay. It should be noted that, the subscript x of the data $D_{(x,m+1)}$ indicates that the data $D_{(x,m+1)}$ is data provided by the x-th processing circuit, and (m+1) indicates the (m+1)-th processing circuit.

Figure 3B:
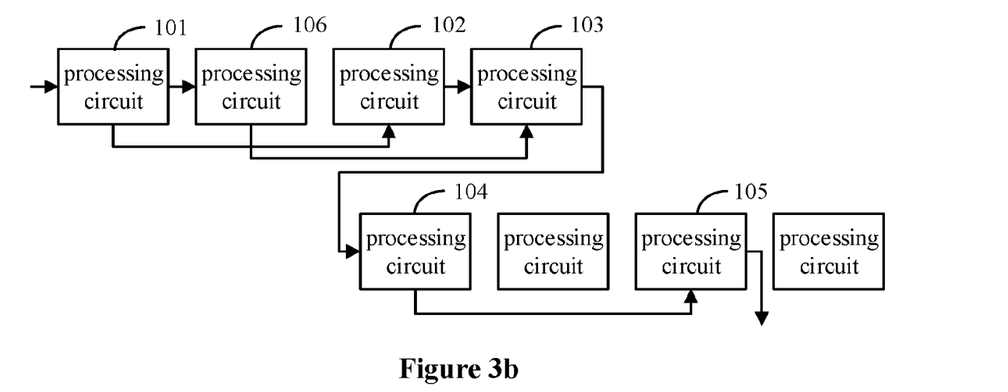

For example, it is assumed that the x-th processing circuit is the first processing circuit, and the (m+1)-th circuit is the second stage processing circuit 106, as shown in FIG. 3b, i.e., the first stage processing circuit 101, then the first processing circuit may replicate data $D_{(1,2)}$ to obtain data $D_{(1,m+1)}$, and send the data $D_{(1,2)}$ and the data $D_{(1,m+1)}$ to the second stage processing circuit 106 and the third stage processing circuit 102 respectively.

It is assumed that, the x-th processing circuit is the (m−1)-th processing circuit, i.e., the fifth stage processing circuit 104 as shown in FIG. 3b, and the (m+1)-th processing circuit is an eighth stage processing circuit, then the fifth stage processing circuit 104 may replicate the data $D_{(m-1,m)}$ to obtain data $D_{(m-1,m+1)}$, and send the data $D_{(m-1,m)}$ and the data $D_{(m-1,m+1)}$ to the seventh stage processing circuit 105 and the eighth stage processing circuit respectively.

Furthermore, in a case that the data $D_{(x,m+1)}$ is received by the (m+1)-th, the (m+1)-th processing circuit processes the data $D_{(x,m+1)}$ to obtain data $D_{(m+1,y)}$ and send the data $D_{(m+1,y)}$ to an y-th processing circuit. The y-th processing circuit is the arbiter or one of an (x+2)-th processing circuit to the m-th processing circuit.

Continuing in the above-described examples, in the first example in which the x-th processing circuit is the first processing circuit, the y-th processing circuit may be one of the third processing circuit to the m-th processing circuit. The y-th processing circuit is the third processing circuit, i.e., the fourth stage processing circuit 103, as shown in FIG. 3b. In the embodiment as shown in FIG. 3b, parallel processing is performed via only one processing circuit, i.e., the second processing circuit. In other words, the parallel processing is performed by only the second processing circuit and the (m+1)-th processing circuit, and convergence occurs at the third processing circuit. In practice, parallel processing may be performed via multiple processing circuits. For example, the parallel processing may be performed via the second processing circuit, the third processing circuit, the fourth processing circuit until to the (m−1)-th processing circuit and the (m+1)-th processing circuit, and convergence occurs at the m-th processing circuit, in this case, the y-th processing circuit is the m-th processing circuit.

In the second example described above in which the x-th processing circuit is the (m−1)-th processing circuit, i.e., the fifth stage processing circuit 104 as shown in FIG. 3b, and the (m+1)-th processing circuit is the eighth stage processing circuit, hence the (m+1)-th processing circuit sends the data $D_{(m+1,y)}$ to the arbiter, in this case, the y-th processing circuit is the arbiter.

Optionally, in a case that the y-th processing circuit is one of the (x+2)-th processing circuit to the m-th processing circuit, the y-th processing circuit is further configured to receive the data $D_{(m+1,y)}$ and perform mergence on the data $D_{(m+1,y)}$ and data $D_{(y-1,y)}$ to obtain merged data. Specifically, the data $D_{(y-1,y)}$ is data provided by an (y−1)-th processing circuit. The y-th processing circuit is further configured to process the merged data to obtain data $D_{(y,y+1)}$, and send the data $D_{(y,y+1)}$ to an (y+1)-th processing circuit or the arbiter. The y-th processing circuit sends the data $D_{(y,y+1)}$ to the arbiter in a case that the y-th processing circuit is the m-th processing circuit.

Since the time instant when the data $D_{(m+1,y)}$ reaches the y-th processing circuit may be different from the time instant when the data $D_{(y-1,y)}$ reaches the y-th processing circuit, the data $D_{(m+1,y)}$ and the data $D_{(y-1,y)}$ are merged for ease of processing the two pieces of data by the y-th processing circuit.

In practice, there are multiple ways to merge the two pieces of data. Specifically, the y-th processing circuit is configured to retain only one of the data $D_{(m+1,y)}$ and the data $D_{(y-1,y)}$.

Alternatively, the y-th processing circuit is configured to align the data $D_{(m+1,y)}$ and the data $D_{(y-1,y)}$ field by field, and select, for each field, data of the data $D_{(m+1,y)}$ or data $D_{(y-1,y)}$ in the field, to form the merged data.

Specifically, aligning the data $D_{(m+1,y)}$ and the data $D_{(y-1,y)}$ field by field may be that: the data $D_{(m+1,y)}$ and the data $D_{(y-1,y)}$ each includes multiple fields. The same fields of the data $D_{(m+1,y)}$ and data $D_{(y-1,y)}$ are aligned. For example, the data $D_{(m+1,y)}$ and the data $D_{(y-1,y)}$ each may include a destination Internet Protocol (IP) address field and a destination Media Access Control (MAC) protocol address field. Specifically, the destination IP address field is used to carry a destination IP address. The destination MAC address field is used to carry a destination MAC address.

Figure 4A:
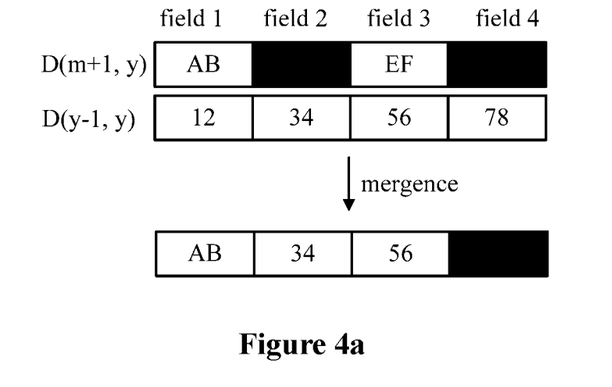
FIG. 4a to FIG. 4b are schematic diagrams of merged data according to embodiments of the present application.
Figure 4B:
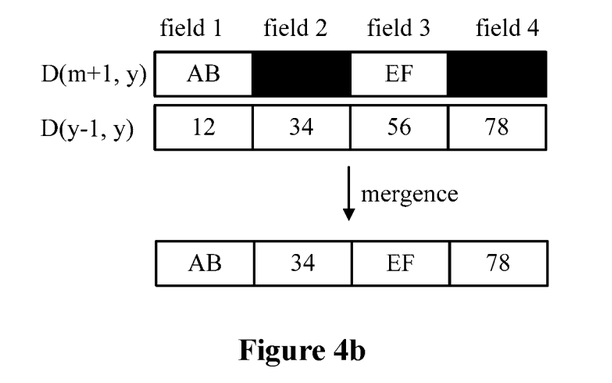

Reference is made to FIG. 4a and FIG. 4b, which show two different implementations, for the manner of aligning the data $D_{(m+1,y)}$ and the data $D_{(y-1,y)}$ field by field and selecting, for each field, data of the data $D_{(m+1,y)}$ or data $D_{(y-1,y)}$ in the field to form the merged data.

In the manner as shown in FIG. 4a, the data $D_{(m+1,y)}$ and the data $D_{(y-1,y)}$ are aligned field by field. For example, each data includes four fields, and an exclusive input source may be assigned for each field. For example, in the manner as shown in FIG. 4a, data AB in field 1 of the data $D_{(m+1,y)}$ is retained for field 1 of the merged data; data 34 in field 2 of the data $D_{(y-1,y)}$ is retained for field 2 of the merged data; data 56 in field 3 of the data $D_{(y-1,y)}$ is retained for field 3 of the merged data; and data in field 4 of the data $D_{(m+1,y)}$ is retained for field 4 of the merged data. The black part indicates invalid data. For example, the valid data may be unassigned data, or field data in a field which is invalidated by a processing circuit.

The manner as shown in FIG. 4b is similar to the manner as shown in FIG. 4a. FIG. 4b differs from FIG. 4a in that, for each field, which data is retained is determined based on priorities of the data $D_{(m+1,y)}$ and the data $D_{(y-1,y)}$. In FIG. 4b, in field 1 and field 3, the priority of the data $D_{(m+1,y)}$ is greater than the priority of the data $D_{(y-1,y)}$. In field 2 and field 4, the priority of the data $D_{(m+1,y)}$ is smaller than the priority of the data $D_{(y-1,y)}$.

For example, the data $D_{(m+1,y)}$ and the data $D_{(y-1,y)}$ may carry information indicating a priority of each field thereof. A value of each field in the merged data is equal to a value of the corresponding field having a higher priority.

For example, information on a priority of a destination IP address field carried in the data $D_{(m+1,y)}$ indicates that the priority of the destination IP address field of the data $D_{(m+1,y)}$ is high. Information on a priority of a destination IP address field carried in the data $D_{(y-1,y)}$ indicates that the priority of the destination IP address field of the data $D_{(y-1,y)}$ is low. Information on a priority of a destination MAC address field carried in the data $D_{(m+1,y)}$ indicates that the priority of the destination MAC address field of the data $D_{(m+1,y)}$ is low. Information on a priority of a destination MAC address field carried in the data $D_{(y-1,y)}$ indicates that the priority of the destination MAC address field of the data $D_{(y-1,y)}$ is high. Hence, a value of a destination IP address field in the merged data is equal to a value of the destination IP address field in the data $D_{(m+1,y)}$. A value of a destination MAC address field in the merged data is equal to a value of the destination MAC address field in the data $D_{(y-1,y)}$.

Figure 5:
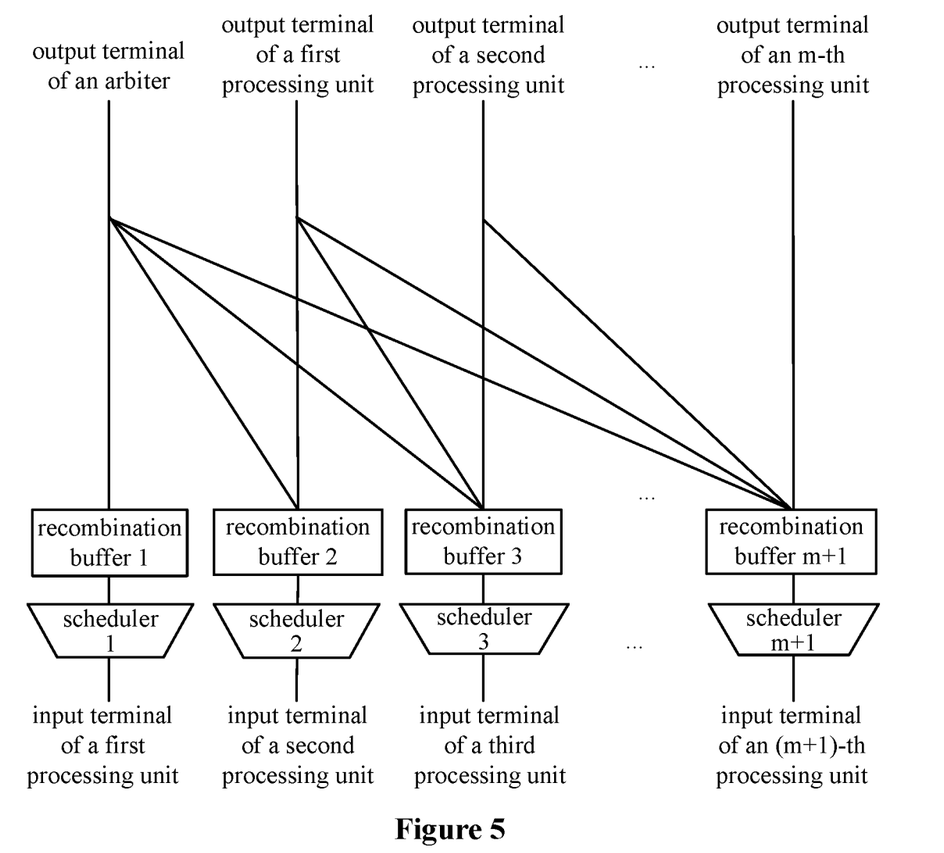
FIG. 5 is a structure diagram of an implementation of a processing circuit according to embodiments of the present application.

In conjunction with the above embodiments, for any two processing circuits, a p-th processing circuit and a q-th processing circuit, of the first processing circuit to the m-th processing circuit, an output terminal of the p-th processing circuit is connected to an input terminal of the q-th processing circuit, an output terminal of the q-th processing circuit is not connected to an input terminal of the p-th processing circuit, where p is less than q. As shown in FIG. 5. In other words, among the processing circuits of N stages of the processor, an output terminal of a j-th stage processing circuit is connected to input terminals of a (j+1)-th stage processing circuit to an N-th stage processing circuit, and is not connected to input terminals of the first stage processing circuit to a (j−1)-th stage processing circuit.

A possible implementation structure of the processor according to the embodiment of the present application is illustrated below by an example. It is assumed that, the processor includes processing circuits of (m+1) stages totally, m processing circuits respectively correspond to the first stage processing circuit to the m-th stage processing circuit, an (m+1)-th processing circuit corresponds to an (m+1)-th stage processing circuit. Each of the processing circuits includes a recombination buffer, a scheduler and a processing unit. For example, referring to FIG. 5, the first stage processing circuit includes a recombination buffer 1, a scheduler 1 and a first processing unit (not shown in FIG. 5). An output terminal of the arbiter may be connected to input terminals of all the processing circuits. An output terminal of the first processing unit may be connected to input terminals of the second processing circuit to the (m+1)-th stage processing circuit.

After data is received by each stage of the processing circuit, the data may be stored in the recombination buffer, and the preceding data mergence may be performed by the recombination buffer. In a case that the data stored in the recombination buffer comes from multiple different input sources, the scheduler may selectively schedule the input data of the multiple input sources to the processing unit based on a predetermined rule, for example, which data of the input data of the multiple input sources is firstly scheduled to the processing unit to process.

For example, the predetermined rule may be a strict priority scheduling rule based on the priority of the data or stage numbers in the pipeline, or may be a polling scheduling rule.

Optionally, the processing unit is mainly used to complete processing action of protocol independent forwarding, and the processing unit may include a table lookup unit and an action unit to implement functions of looking up a table and performing a forwarding action. In an implementation of the action unit, one or more processor cores may be used to process input data in parallel, in the case, a relatively complex processing operation can be performed. Alternatively, a combination of a series connection and a parallel connection of multiple arithmetic logic units may be used to process the input data, and the implementation thereof is relatively simple.

Furthermore, the processor according to the embodiment may solve a problem that a loopback performance is halved in complex processing of the conventional pipeline. The way is to deploy loopback instructions on multiple processing circuits uniformly, thereby realizing an effect similar as load balancing and improving throughput capacity of the whole pipeline. Hence, in a case that data $D_{(a,1)}$ outputted to the arbiter is not a final processing result, it indicates that loopback is required. The arbiter then is further configured to uniformly distribute traffic corresponding to the data $D_{(a,1)}$ to be looped back to m processing circuits to process. In this case, the m processing circuits form multiple independent segments of the processing pipeline which process the data $D_{(a,1)}$ in parallel.

Figure 6:
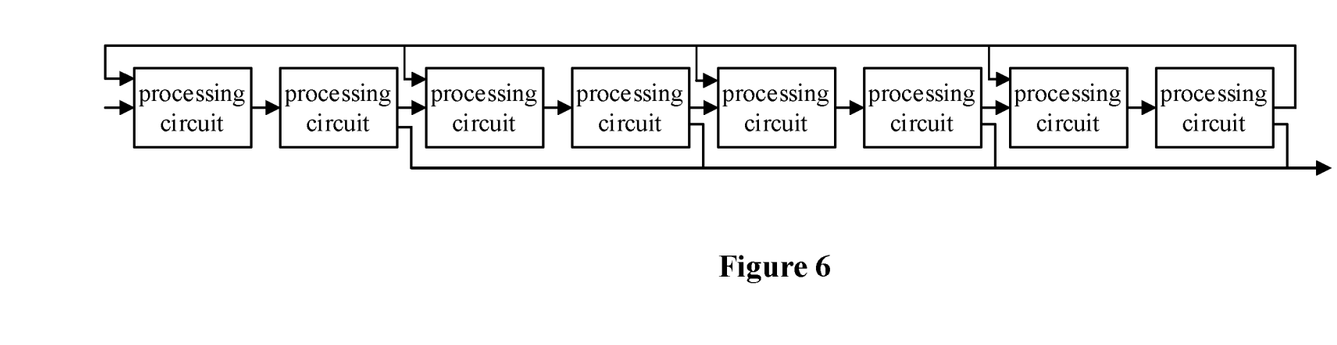
FIG. 6 is a schematic diagram of loopback processing according to embodiments of the present application.

For example, referring to FIG. 6, it is assumed that the pipeline includes processing circuits of nine stages, and processing circuits of ten stages are required for the forwarding service to achieve the processing. In a loopback manner of the conventional pipeline, data traverses the processing circuits of the nine stages twice, which reduces the throughput rate of the whole service to be 50% of the throughput rate of the pipeline. The processing may be divided into two parts, the former part occupies eight processing circuits, which are mapped to the first stage processing circuit to the eighth stage processing circuit, and are responsible for 80% of data processing of the throughput rate of the pipeline. The later part occupies two processing circuits which process each packet in a load sharing way. For example, the arbiter allocates a first processing result to a first stage processing circuit to process upon receipt of the first processing result, and the arbiter allocates a second processing result to a third stage processing circuit to process upon receipt of the second processing result, and so on, which is equivalent to uniformly distribute 80% of the traffic on four short segments of the pipeline, and each segment of the pipeline processes 20% of the traffic. In this case, 80% of data processing of the throughout rate of the pipeline can be realized in total, which is obviously superior to 50% of the conventional pipeline architecture in performance.

Optionally, the processor further includes a message editor. The arbiter outputs the processing result to the message editor, and the message editor is configured to perform an editing operation on inputted data $D_{(a,1)}$ based on a requirement of message forwarding, such as inserting, replacing or deleting a header or a field of certain layer protocol, and calculating a check sum.

In practice, the processor according to the embodiment of the present application may be applied to a switch, a router or other data processing device requiring pipeline processing. The data processing device includes a receiver configured to receive first data, the processor as described in the embodiments described above which is configured to process the first data to obtain second data, and a transmitter configured to transmit the second data.

Figure 7:
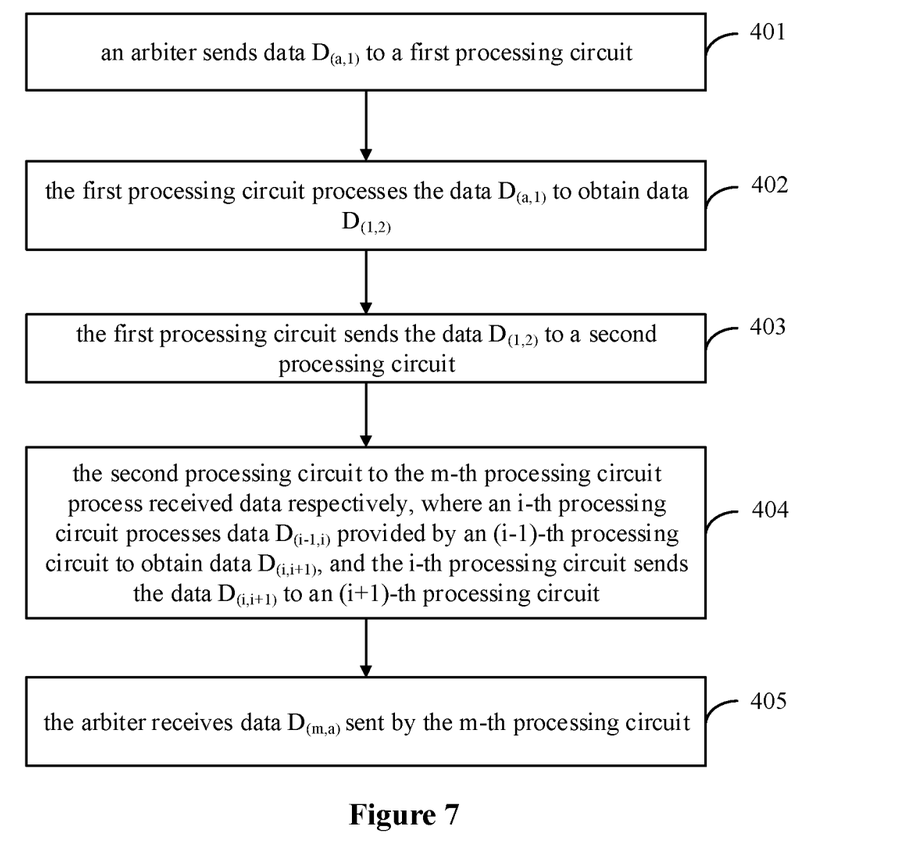
FIG. 7 is a flowchart of a data processing method according to embodiments of the present application.

Based on the same invention concept, a data processing method is further provided according to embodiments of the present application. An executive body of the method may be a processor. FIG. 7 is a schematic flowchart of the method. The processor as shown in FIG. 2, FIG. 3a and/or FIG. 3b may be used to perform the method as shown in FIG. 7. An implementation and meaning of terms related to the method as shown in FIG. 7 may refer to FIG. 2, FIG. 3a and/or FIG. 3b and related description of the embodiments. Referring to FIG. 7, the method includes the following contents.

401: an arbiter sends data $D_{(a,1)}$ to a first processing circuit.

402: the first processing circuit processes the data $D_{(a,1)}$ to obtain data $D_{(1,2)}$.

403: the first processing circuit sends the data $D_{(1,2)}$ to a second processing circuit.

404: the second processing circuit to an m-th processing circuit process received data respectively, where an i-th processing circuit processes data $D_{(i-1,i)}$ provided by an (i−1)-th processing circuit to obtain data $D_{(i,i+1)}$, and the i-th processing circuit sends the data $D_{(i,i+1)}$ to an (i+1)-th processing circuit.

405: the arbiter receives data $D_{(m,a)}$ sent by the m-th processing circuit.

Optionally, an x-th processing circuit sends data $D_{(x,m+1)}$ to an (m+1)-th processing circuit, where the data $D_{(x,m+1)}$ is identical to data $D_{(x,x+1)}$, the data $D_{(x,x+1)}$ is obtained by processing, by the x-th processing circuit, data $D_{(x-1,x)}$ provided by an (x−1)-th processing circuit, and the x-th processing circuit is one of the first processing circuit to an (m−1)-th processing circuit.

Furthermore, after the x-th processing circuit sends the data $D_{(x,m+1)}$ to the (m+1)-th processing circuit, the method further includes: processing, by the (m+1)-th processing circuit, the data $D_{(x,m+1)}$ to obtain data $D_{(m+1,y)}$; and sending, by the (m+1)-th processing circuit, the data $D_{(m+1,y)}$ to a y-th processing circuit, where the y-th processing circuit is the arbiter or one of an (x+2)-th processing circuit to the m-th processing circuit.

Furthermore, the method further includes: receiving, by the y-th processing circuit, the data $D_{(m+1,y)}$, where the y-th processing circuit is one of the (x+2)-th processing circuit to the m-th processing circuit; performing, by the y-th processing circuit, mergence on the data $D_{(m+1,y)}$ and data $D_{(y-1,y)}$ to obtain merged data, where the data $D_{(y-1,y)}$ is data provided by a (y−1)-th processing circuit; processing, by the y-th processing circuit, the merged data to obtain data $D_{(y,y+1)}$; and sending, by the y-th processing circuit, the data $D_{(y,y+1)}$ to an (y+1)-th processing circuit or the arbiter.

Furthermore, the performing, by the y-th processing circuit, mergence on the data $D_{(m+1,y)}$ and the data $D_{(y-1,y)}$ to obtain the merged data includes: retaining, by the y-th processing circuit, one of the data $D_{(m+1,y)}$ and the data $D_{(y-1,y)}$; or aligning, by the y-th processing circuit, the data $D_{(m+1,y)}$ and the data $D_{(y-1,y)}$ field by field, and selecting, for each field, data of the data $D_{(m+1,y)}$ or data $D_{(y-1,y)}$ in the field, to form the merged data.

In conjunction with the above embodiments, for any two processing circuits, a p-th processing circuit and a q-th processing circuit, of the first processing circuit to the m-th processing circuit, an output terminal of the p-th processing circuit is connected to an input terminal of the q-th processing circuit, and an output terminal of the q-th processing circuit is not connected to an input terminal of the p-th processing circuit, where p is less than q.

An implementation of the data processing method according to the embodiment has been described in detail in the preceding description for operation processes of the processor and each component of the processor. On this basis, those skilled in the art can clearly know the implementation of the data processing method according to the embodiment, and thus the detailed description is omitted here for simplicity of the specification.

Those skilled in the art should understand that the embodiment of the present application may be provided as a method, a system, or a computer program product. Accordingly, the present application can be in a form of a hardware embodiment, a software embodiment or a combination of a hardware and a software embodiment. Moreover, the present application may be in a form of a computer program product which is implemented on one or more computer-usable storage medias (including but not limited to a disk storage, a compact disk read-only memory (CD-ROM) and an optical memory, etc.) containing computer usable program codes.

The present application is described with reference to the flowcharts and/or block diagrams of the method, the device (system), and the computer program product according to the embodiments of the present application. It should be understood that computer program instructions are used to realize each flow and/or block of the flowcharts and/or block diagrams, as well as a combination of the flow and/or the block of the flowcharts and/or block diagrams. These computer program instructions may be provided to a processor of a general purpose computer, a special purpose computer, an embedded processor or other programmable data processing device to produce a machine, so that an apparatus for realizing a function specified in one or more flows of the flowcharts and/or one or more blocks of the block diagrams is produced by instructions executed by the processor of the computer or other programmable data processing device.

These computer program instructions may also be stored in a computer-readable memory that can direct the computer or the other programmable data processing device to operate in a specific manner, so that the instructions stored in the computer-readable memory may produce an article including an instruction means. The instruction means is configured to achieve the function specified in the one or more flows of the flowcharts and/or the one or more blocks of the block diagrams.

These computer program instructions may also be loaded onto the computer or the other programmable data processing device, so that the computer or the other programmable device performs a series of operation steps to generate processing realized by the computer. Hence, the instructions executed on the computer or the other programmable device are used to provide steps for realizing the function specified in the one or more flows of the flowcharts and/or the one or more boxes of the block diagrams.

It is apparent for those skilled in the art that various changes and variations may be made on the embodiments of the present application without departing from the spirit and the scope of the embodiments of the present application. Hence, the present application is intended to contain these changes and variations if these changes and variations on the embodiments of the present application belong to the scope of the claims and the equivalent technology of the present application.

What is claimed is:

1. A data processing method, comprising:
sending, by an arbiter, data $D_{(a,1)}$ to a first processing circuit;
processing, by the first processing circuit, the data $D_{(a,1)}$ to obtain data $D_{(1,2)}$, wherein the first processing circuit is one of m processing circuits, and the m processing circuits comprise the first processing circuit to an m-th processing circuit;
sending, by the first processing circuit, the data $D_{(1,2)}$ to a second processing circuit;
processing, by the second processing circuit to the m-th processing circuit, received data respectively, wherein an i-th processing circuit processes data $D_{(i-1,i)}$ provided by an (i−1)-th processing circuit to obtain data $D_{(i,i+1)}$, and the i-th processing circuit sends the data $D_{(i,i+1)}$ to an (i+1)-th processing circuit; and
receiving, by the arbiter, data $D_{(m,a)}$ sent by the m-th processing circuit, wherein m is an integer greater than 1,
wherein the arbiter and the first processing circuit to the m-th processing circuit are components of a processor, the processor further comprises an (m+1)-th processing circuit which refrains from processing the data $D_{(m,a)}$ sent from the m-th processing circuit and sending the data $D_{(m,a)}$ to the arbiter, and wherein each of the first processing circuit to the (m+1)-th processing circuit is capable of receiving first data to be processed sent by the arbiter and processing the first data to be processed.

2. The method according to claim 1, further comprising:
sending, by an x-th processing circuit, data $D_{(x,m+1)}$ to the (m+1)-th processing circuit, wherein the data $D_{(x,m+1)}$ is identical to data $D_{(x,x+1)}$, the data $D_{(x,x+1)}$ is obtained by processing, by the x-th processing circuit, data $D_{(x-1,x)}$ provided by an (x−1)-th processing circuit, and the x-th processing circuit is one of the first processing circuit to an (m−1)-th processing circuit.

3. The method according to claim 2, wherein after sending, by the x-th processing circuit, the data $D_{(x,m+1)}$ to the (m+1)-th processing circuit, the method further comprises:
processing, by the (m+1)-th processing circuit, the data $D_{(x,m+1)}$ to obtain data $D_{(m+1,y)}$; and
sending, by the (m+1)-th processing circuit, the data $D_{(m+1,y)}$ to a y-th processing circuit, wherein the y-th processing circuit is the arbiter or one of an (x+2)-th processing circuit to the m-th processing circuit.

4. The method according to claim 3, further comprising:
receiving, by the y-th processing circuit, the data $D_{(m+1,y)}$, wherein the y-th processing circuit is one of the (x+2)-th processing circuit to the m-th processing circuit;
performing, by the y-th processing circuit, mergence on the data $D_{(m+1,y)}$ and data $D_{(y-1,y)}$ to obtain merged data, wherein the data $D_{(y-1,y)}$ is data provided by an (y−1)-th processing circuit;
processing, by the y-th processing circuit, the merged data to obtain data $D_{(y,y+1)}$; and
sending, by the y-th processing circuit, the data $D_{(y,y+1)}$ to a (y+1)-th processing circuit or the arbiter.

5. The method according to claim 4, wherein performing, by the y-th processing circuit, mergence on the data $D_{(m+1,y)}$ and the data $D_{(y-1,y)}$ to obtain the merged data comprises:
retaining, by the y-th processing circuit, one of the data $D_{(m+1,y)}$ and the data $D_{(y-1,y)}$.

6. The method according to claim 4, wherein performing, by the y-th processing circuit, mergence on the data $D_{(m+1,y)}$ and the data $D_{(y-1,y)}$ to obtain the merged data comprises:
aligning, by the y-th processing circuit, the data $D_{(m+1,y)}$ and the data $D_{(y-1,y)}$ field by field, and selecting, for each field, data of the data $D_{(m+1,y)}$ or data $D_{(y-1,y)}$ in the field, to form the merged data.

7. The method according to claim 1, wherein for any two processing circuits, a p-th processing circuit and a q-th processing circuit, of the first processing circuit to the m-th processing circuit, an output terminal of the p-th processing circuit is connected to an input terminal of the q-th processing circuit, and an output terminal of the q-th processing circuit is not connected to an input terminal of the p-th processing circuit, wherein p is less than q.

8. A processor, comprising:
an arbiter;
m processing circuits comprising a first processing circuit to an m-th processing circuit, wherein the m processing circuits are coupled to the arbiter respectively, wherein m is an integer greater than 1; and
an (m+1)-th processing circuit coupled to the arbiter, wherein each of the first processing circuit to the (m+1)-th processing circuit is capable of receiving first data to be processed sent by the arbiter and processing the first data to be processed,
wherein the arbiter is configured to send data $D_{(a,1)}$ to the first processing circuit; the first processing circuit is configured to process the data $D_{(a,1)}$ to obtain data $D_{(1,2)}$, and send the data $D_{(1,2)}$ to a second processing circuit; and the second processing circuit to the m-th processing circuit are configured to process received data respectively, and wherein an i-th processing circuit is configured to process data $D_{(i-1,i)}$ provided by an (i−1)-th processing circuit to obtain data $D_{(i,i+1)}$, and send the data $D_{(i,i+1)}$ to an (i+1)-th processing circuit; and wherein the arbiter is further configured to receive data $D_{(m,a)}$ sent by the m-th processing circuit, and the (m+1)-th processing circuit refrains from processing the data $D_{(m,a)}$ sent from the m-th processing circuit and sending the data $D_{(m,a)}$ to the arbiter.

9. The processor according to claim 8, wherein
an x-th processing circuit is configured to send data $D_{(x,m+1)}$ to the (m+1)-th processing circuit, wherein the data $D_{(x,m+1)}$ is identical to data $D_{(x,x+1)}$, the data $D_{(x,x+1)}$ is obtained by processing, by the x-th processing circuit, data $D_{(x-1,x)}$ provided by an (x−1)-th processing circuit, and the x-th processing circuit is one of the first processing circuit to an (m−1)-th processing circuit.

10. The processor according to claim 8, wherein for any two processing circuits, a p-th processing circuit and a q-th processing circuit, of the first processing circuit to the m-th processing circuit, an output terminal of the p-th processing circuit is connected to an input terminal of the q-th processing circuit, and an output terminal of the q-th processing circuit is not connected to an input terminal of the p-th processing circuit, wherein p is less than q.

11. The processor according to claim 9, wherein
the (m+1)-th processing circuit is configured to process the data $D_{(x,m+1)}$ to obtain data $D_{(m+1,y)}$ and send the data $D_{(m+1,y)}$ to a y-th processing circuit, wherein the y-th processing circuit is the arbiter or one of an (x+2)-th processing circuit to the m-th processing circuit.

12. The processor according to claim 11, wherein i in a case that the y-th processing circuit is one of the (x+2)-th processing circuit to the m-th processing circuit, the y-th processing circuit is further configured to: receive the data $D_{(m+1,y)}$ and perform mergence on the data $D_{(m+1,y)}$ and data $D_{(y-1,y)}$ to obtain merged data, wherein the data $D_{(y-1,y)}$ is data provided by an (y−1)-th processing circuit; process the merged data to obtain data $D_{(y,y+1)}$; and send the data $D_{(y,y+1)}$ to a (y+1)-th processing circuit or the arbiter.

13. The processor according to claim 12, wherein the y-th processing circuit is configured to:
retain one of the data $D_{(m+1,y)}$ and the data $D_{(y-1,y)}$.

14. The processor according to claim 12, wherein the y-th processing circuit is configured to:
align the data $D_{(m+1,y)}$ and the data $D_{(y-1,y)}$ field by field, and select, for each field, data of the data $D_{(m+1,y)}$ or data $D_{(y-1,y)}$ in the field, to form the merged data.

15. A data processing device, comprising:
a receiver configured to receive first data;
a processor, configured to process the first data to obtain second data, comprising:
an arbiter;
m processing circuits comprising a first processing circuit to an m-th processing circuit, wherein the m processing circuits are coupled to the arbiter respectively, wherein m is an integer greater than 1; and
an (m+1)-th processing circuit coupled to the arbiter, wherein each of the first processing circuit to the (m+1)-th processing circuit is capable of receiving the first data to be processed sent by the arbiter and processing the first data to be processed,
wherein the arbiter is configured to send data $D_{(a,1)}$ to the first processing circuit; the first processing circuit is configured to process the data $D_{(a,1)}$ to obtain data $D_{(1,2)}$, and send the data $D_{(1,2)}$ to a second processing circuit; and the second processing circuit to the m-th processing circuit are configured to process received data respectively, and wherein an i-th processing circuit is configured to process data $D_{(i-1,i)}$ provided by an (i−1)-th processing circuit to obtain data $D_{(i,i+1)}$, and send the data $D_{(i,i+1)}$ to an (i+1)-th processing circuit; and wherein the arbiter is further configured to receive data $D_{(m,a)}$ sent by the m-th processing circuit, and the (m+1)-th processing circuit refrains from processing the data $D_{(m,a)}$ sent from the m-th processing circuit and sending the data $D_{(m,a)}$ to the arbiter; and
a transmitter configured to transmit the second data.

* * * * *

UNITED STATES PATENT AND TRADEMARK OFFICE
CERTIFICATE OF CORRECTION

PATENT NO. : 10,025,752 B2
APPLICATION NO. : 15/337872
DATED : July 17, 2018
INVENTOR(S) : Li et al.

Page 1 of 1

It is certified that error appears in the above-identified patent and that said Letters Patent is hereby corrected as shown below:

In the Claims

Column 15, Line 27 "wherein i in a" should read -- wherein in a --.

Signed and Sealed this
Second Day of October, 2018

Andrei Iancu
*Director of the United States Patent and Trademark Office*